INVENTORS
Raymond E. Summerer, &
BY  John B. Force
Thomas N. Young
ATTORNEY 3,543,572
IGNITION SUPPRESSION SYSTEM
Raymond E. Summerer, Grand Blanc, and John B. Force, Bancroft, Mich., assignors to General Motors Corporation, Detroit, Mich., a corporation of Delaware
Filed Aug. 19, 1968, Ser. No. 753,429
Int. Cl. G01m 15/00
U.S. Cl. 73—116                                         3 Claims

ABSTRACT OF THE DISCLOSURE

An agitation suppression system for testing internal combustion engines by selectively disabling one or more cylinders. Ignition voltage pulses are counted in a digital register. Outputs from the register are connected through selection means to a disable switch to short the distributor points each time a preselected count is attained.

---

This invention relates to electronic ignition suppression systems of the type used to evaluate performance contributions of individual cylinders of an internal combustion engine by selectively disabling one or more cylinders and noting the resulting loss of engine performance or speed.

Systems of the type to which this invention relates provide for selective spark ignition suppression, that is, repeated suppression of the spark ignition in one or more selected cylinders of a multicylinder internal combustion engine. This may be accomplished in accordance with the prior art by establishing a time reference such as the firing of the first cylinder in the firing order and shorting the distributor points after a predetermined time delay. The time delay may be equated to the interval between the firing of the first cylinder in the firing order and the firing of a cylinder of interest. This system obviously requires that the engine be operated at a fixed speed so that the interval between the first cylinder firing and that of the selected cylinder remains constant.

Other prior art systems monitor firing order and firing intervals as a function of mechanical rotation of some element which is synchronized with distributor rotation. Such systems are therefore termed synchronous. Systems of this type have heretofore required complex mechanical installations and precise mechanical parts so that the angular displacement of the mechanical element monitoring firing order is continuously and accurately representative of engine firing progression. Moreover, such as mechanical system must be finely balanced in order to avoid errors arising from various force components which occur at higher speeds of rotation.

The present invention provides precise, in-step operation in a reliable, accurate and comparatively simple electronic system for ignition suppression control. The invention permits selective cylinder performance evaluation to be performed at any speed or at various speeds during a single test without the need for adjustment of any kind to the suppressor system. This is accomplished by monitoring igniter voltage pulses in a register which provides discrete outputs for each count accumulated therein. These outputs, which may be presented on respective channels, may be selectively applied by means of a simple switch operation to a signal responsive device such as a thyristor to short circuit an electrical distribution device such as the distributor during the period of actuation of any selected igniter. Since the register is a digital device responsive to individual input signals and can be made to operate insensitive to time or the rate of occurrence of the input pulses, the system is therefor insensitive to variations in engine speed which might vary the rate or frequency of the igniter actuation.

Moreover, the invention may be easily adapted for engines of various numbers of cylinders as well as different combinations of cylinder selections for suppression purposes. This may be accomplished by means of switches which effectively remove or add bistable stages of the digital counting register from circuit.

Other advantages of the invention will be apparent from the following specification which describes an illustrative embodiment of the invention. This specification is to be taken in conjunction with the drawings of which:

Figure 1:
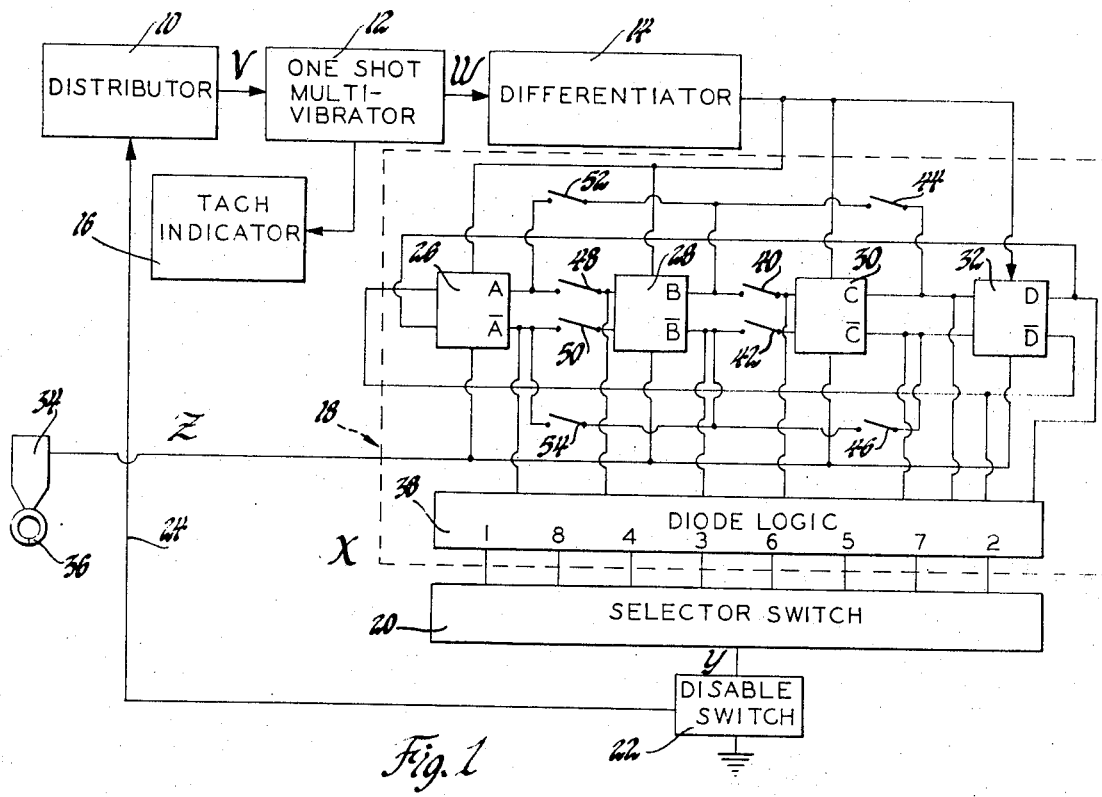
FIG. 1 is a block diagram of an illustrative embodiment of the invention for use with engines with up to eight cylinders.

The embodiment of the invention shown in FIG. 1 is applicable to internal combustion engines having up to eight cylinders and a spark igniter plug for each cylinder together with an electrical device such as a distributor for distributing discrete voltage pulses to the igniter plugs in a predetermined sequence. The system is therefore applicable to the ordinary automotive engine to suppress the actuation of one or more selective igniter plugs repeatedly and without affecting other unselected igniter plugs.

Figure 3:
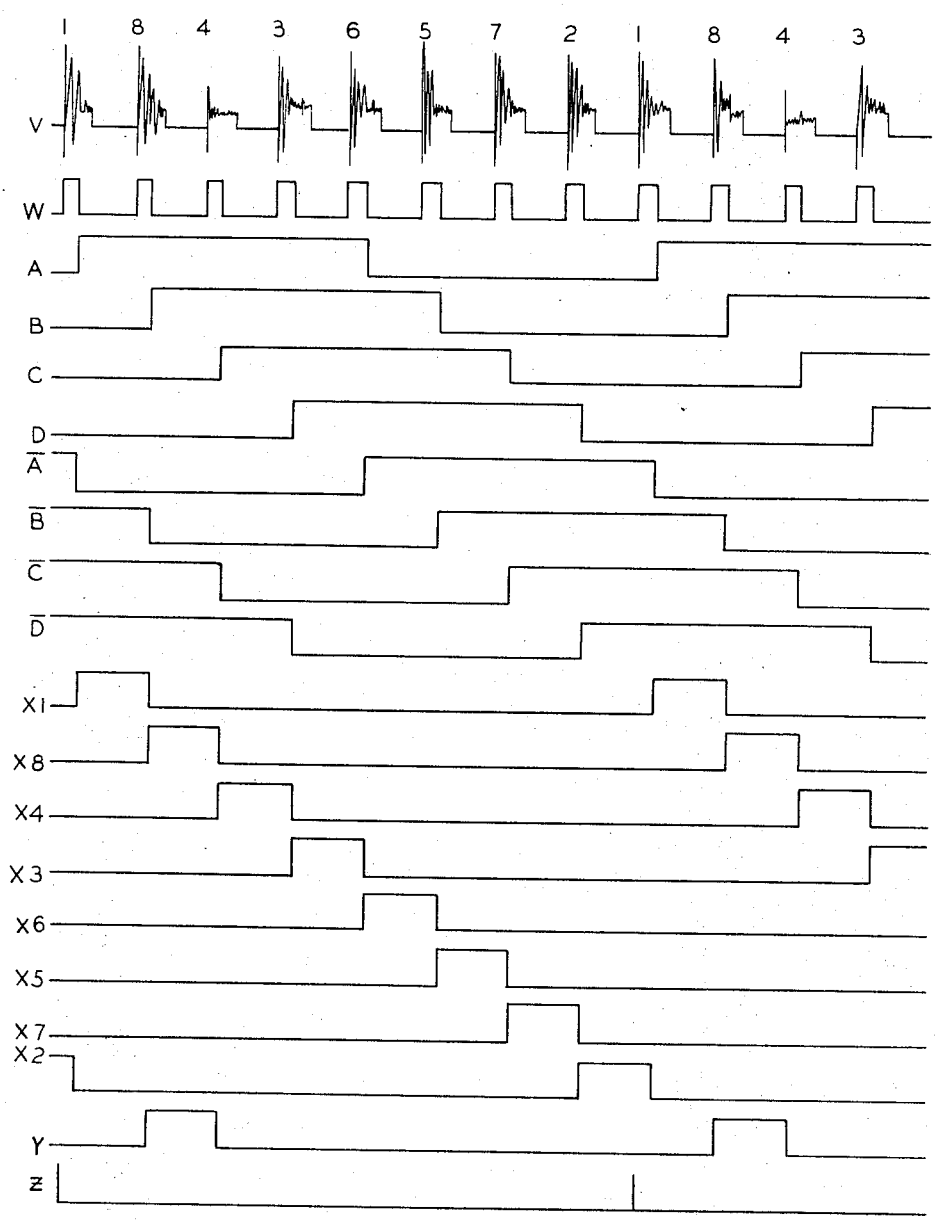
FIG. 3 is a chart of the waveforms appearing in the circuits of FIG. 1.

The system of FIG. 1 is shown connected to an ordinary rotating distributor 10 of the type found on most automobile engines. The distributor 10 produces discrete voltage pulses which are applied after amplification to the igniter plugs of the engine in a predetermined sequence determined by the wiring between the distributor and the individual igniters. The voltage pulses which are produced by the distributor 10 and represented on line V of FIG. 3 are applied to the input of an astable multivibrator 12 which produces a short rectangular waveform upon the application of each voltage pulse from distributor 10 as shown on line W of FIG. 3. The rectangular pulses which are generated by the multivibrator 12 are applied to a differentiator circuit 14 to produce a sharp voltage spike at the trailing edge of each of the waveforms. The rectangular signal waveforms produced by the multivibrator 12 may also be connected to a tachometer 16 to provide a continuous indication of engine speed.

The voltage spikes generated by the differentiator 14 and representing the discrete voltage pulses to be supplied to the individual igniters of the engine under test are applied to a digital counting register generally designated as 18. The register 18 is equipped with 8 outpjut channels which are connected to a selector switch 20 which permits the selective application of at least one of the output channels to a disable switch 22. This switch 22 is connected across the distributor points as generally indicated at 24 to short out the distributor points during a time interval which corresponds to the normal time of application of a voltage pulse to a selected igniter plug. This short circuiting of the distributor points causes suppression of the normal actuation of the igniter plug and a consequent disabling of the cylinder in which the igniter plug is installed.

Describing the circuit of FIG. 1 in greater detail, the register 18 is shown to comprise a digital counter including bistable stages 26, 28, 30 and 32. The stages are connected in the fashion of the well known Johnson ring counter in which the two complementary portions of each stage are serially connected to the corresponding complementary portions of the succeeding stage with the exception of the final stage 32. The signal outputs of the complementary portions of the final stage 32 are connected in opposite order back to the inputs of the complementary portions of the initial stage 26 to complete the counting ring.

To actuate the ring counter in register 18 the output of differentiator 14 is connected to each of the stages 26, 28, 30, and 32 to trigger progression of the stages in a manner which is well known to those skilled in the art. Further, to provide a timing reference the output of a plug wire pickup 34 is connected to each of the stages 26, 28, 30 and 32 to reset the stages to an initial condition after the completion of each engine firing sequence. The plug wire pickup 34 may comprise a simple inductive device including a split ferrite core 36 which may be applied about the connecting wire of the first igniter plug in the firing order. The pickup 34 thus generates a signal corresponding to the application of a voltage pulse to the number 1 plug.

The individual output pairs of the counter stages 26, 28, 30 and 32 are connected to a diode logic circuit 38 which combines individual counting stage signals into eight dual combinations representing in coded form the eight successive conditions or counts of the register 18. These eight coded output signals are thus available on the outputs of the diode logic circuit 38 as applied to the selector switch 20. As previously mentioned switch 20 enables selection of one or more of these output signals to be applied to the disable switch 22.

The various circuit elements in the embodiment of FIG. 1 produce output voltage waveforms which will be apparent to those skilled in the art. However to facilitate an understanding of the operation of the embodiment the FIG. 1 is marked with reference letters which identify the individual waveform lines in FIG. 3. In FIG. 3 the rectangular waveforms A, B, C and D represent the waveforms appearing on the uppermost outputs of the counter stages 26, 28, 30 and 32, respectively. In FIG. 3, lines $\overline{A}$, $\overline{B}$, $\overline{C}$ and $\overline{D}$ represents the rectangular waveforms appearing on the lowermost outputs of the counter stages 26, 28, 30 and 32, respectively. In FIG. 3, line X1 through X8 represent the rectangular waveforms appearing on the outputs of register 18 as applied to the selector switch 20. These waveforms show the staggered occurrences of the various output signals. In FIG. 3, line Y indicates the application of a representative signal X8 to the disable switch 22 through selector switch 20. Finally, line Z of FIG. 3 represents the application of a reset signal from pickup 34 to the stages in register 18.

In FIG. 1 the illustrated embodiment having four bistable stages in the register 18 is shown in condition for use in the evaluation of an eight cylinder engine. Since each of the four counting stages 26, 28, 30 and 32 has two conditions it is apparent that eight signal conditions or counts can be represented by dual combinations in the diode logic 38. For a six cylinder engine only three counter stages are required. Accordingly, to accommodate a six cylinder engine stage 30 may be effectively omitted from the circuit of register 18 by opening switches 40 and 42 and closing switches 44 and 46. This procedure routes the output of the complementary portions of stage 28 directly to the corresponding portions of stage 32. In this condition of operation the three bistable stages 26, 28 and 32 present six logic conditions representing six counts to be applied through selector switch 20 to the disable switch 22. Similarly, to accommodate a four cylinder engine only two of the counter stages 26 and 32 are necessary. To accommodate a four cylinder engine switches 48 and 50 are opened effectively eliminating stage 28 from the circuit and switches 52 and 54 are closed along with switches 44 and 46 to directly connect stage 26 to stage 22.

Figure 2:
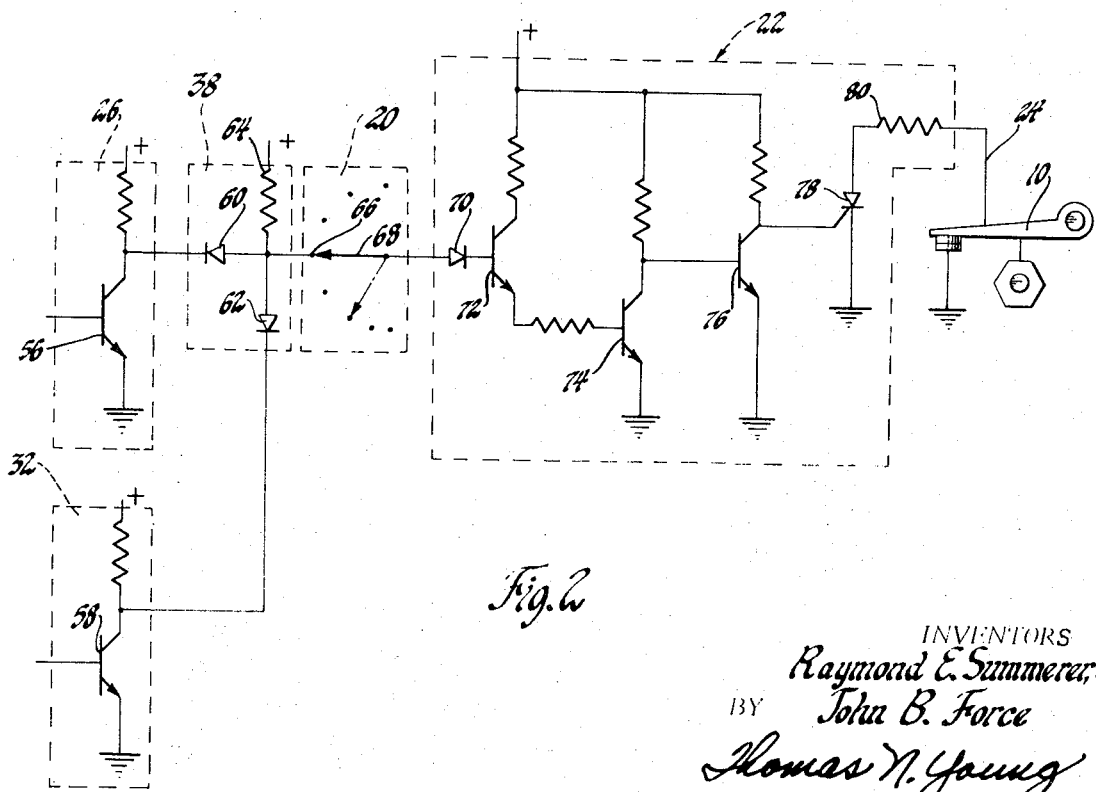
FIG. 2 is a schematic diagram of a representative portion of the circuit of FIG. 1 showing the application of that representative portion to an automotive engine having a distributor.

Referring to FIGS. 1 and 2, a typical operation of the illustrated embodiment will be described. Assuming the previously described connections to the engine are made and the engine is started and running the stages 26, 28, 30 and 32 of the register 18 are initially set to a condition wherein the A, B, C and D outputs are at a low voltage and the complementary outputs are at a high voltage. Upon application of the first pulse to register 18, stage 26 changes to the complementary state but all remaining stages are unaffected. The second pulse changes the stages 28 to the complementary condition, the other stages remaining unaffected. The third and fourth pulses change stages 30 and 32 to the complementary conditions, respectively. The fifth pulse changes stage 26 back to the original condition and so on until after eight pulses all stages are in the initial condition. This reset condition is assured by means of the signal from pickup 34 which is applied to each of the stages of the register 18.

Referring specifically to FIG. 2, the A portion of stage 26 is represented by an NPN transistor 56 having a DC supply connected to the collector and the emitter grounded. The $\overline{A}$ portion of stage 26 is not shown, but it is apparent that it comprises a second transistor. Similarly, the $\overline{D}$ portion of counter stage 32 is represented by an NPN transistor 58 which is similarly connected. The collector electrodes of transistors 56 and 58 are connected through diodes 60 and 62, respectively, to one side of a resistor 64. The other side of resistor 64 is connected to a DC power supply as shown. Diodes 60 and 62 form part of the diode logic circuit 38. As will be apparent to those skilled in the art, the diodes 60 and 62 are arranged so that when A and $\overline{D}$ are both in the high voltage condition the outputs of the diodes is 1. If either A or $\overline{D}$ is in the low voltage condition the diodes cause the output of the logic circuit 38 to be zero. Diode logic circuit 38 is connected to a tap 66 of selector switch 20. As shown, the selector switch has seven other taps each of which may be contacted by a wiper 68. The signal connected through switch 20 is applied through a diode 70 to gate transistors 72 and 74 and finally to a control transistor 76. The output of the control transistor 76 is connected to the control electrode of a thyristor 78 which represents a signal responsive switch. The thyristor 78 is connected through a small resistor 80 to the distributor points 10. When the signal coming from the diode logic 38 is 1 the control transistor 76 applies a signal voltage to the control electrode of thyristor 78 causing the thyristor to conduct. Conduction of thyristor 78 short circuits distributor points 10 during the time an igniter voltage pulse would normally be applied. Accordingly, spark suppression is accomplished. The small resistor 80 is connected between the thyristor and the distributor 10 to provide enough of a signal voltage to operate the register 18.

The above described combination of signals in the diode logic circuit 38 may be arranged to prevent the number 4 spark plug from firing. In similar fashion, signals A and $\overline{B}$ may be combined to prevent the number 8 igniter from firing, B and $\overline{C}$ to prevent number 4 from firing, C and $\overline{D}$ to prevent number 3 from firing, A and D to prevent number 6 from firing, $\overline{A}$ and B to prevent number 5 from firing, C and $\overline{B}$ to prevent number 7 from firing and $\overline{C}$ and D to prevent number 2 from firing. In addition, it may be desirable to provide multiple wipers on switch 20 to enable more than one igniter to be disabled at one time.

It is to be understood that the foregoing description is illustrative in nature and is not to be construed as limiting the invention to the specific embodiment described.

What is claimed is:

1. An ignition suppression system for multicylinder internal combustion engines having a spark ignition for each cylinder and a distributor for applying voltage pulses to the igniters in a predetermined sequence comprising: waveform generator means to be connected to the distributor for providing voltage spikes representing the voltage pulses to be applied to the igniters, a ring counter having a number of bistable stages equal to one half of the number of cylinders in said engine for receiving the spikes and providing a digital count of the number of spikes received, logic circuit means connected to the bistable stages for providing a number of discrete output signals equal to the number of cylinders in the engine and representing the firing sequence thereof, a voltage responsive switch connected across the distributor for shorting the distributor when conductive, and a selector switch having a number of individually selectable circuits for selectively connecting the discrete output signals to the voltage responsive switch.

2. Apparatus as defined in claim 1 further including bypass circuit means connected between at least one of the bistable stages and a subsequent stage for effectively removing at least one of said stages from the ring counter.

3. A synchronous ignition suppression system for multicylinder internal combustion engines having a spark igniter for each cylinder and an electrical device for distributing voltage pulses to the igniter in a predetermined sequence comprising, a ring counter having input circuit means and a number of operating bistable stages equal to one-half the number of cylinders in the engine, logic means connecting coded pairs of said stages to form a plurality of outputs upon which appear discrete signals representing the number of voltage pulses applied to said ring counter input circuit means, means for connecting said ring counter input circuit means to receive the voltage pulses applied to the igniters, signal responsive switch means having a conductive state and a nonconductive state connected across said electrical device to short-circuit said device when conductive, selector means selectively connectable between said outputs and said switch means to render said switch means conductive at a preselected number of voltage pulses, and a signal conductor connected between a predetermined igniter and all of the stages of said ring counter for resetting the stages thereof to a common initial condition representing zero applied voltage pulses after the number of applied pulses equals the number of cylinders in the engine.

References Cited

UNITED STATES PATENTS

| | | | |
|---|---|---|---|
| 3,400,579 | 9/1968 | Paramater et al. | 73—117.3 |
| Re. 26,163 | 2/1967 | Heyer | 324—19 X |
| 2,809,344 | 10/1957 | Mayer et al. | 324—19 |
| 3,286,518 | 11/1966 | Mazurkevics | 314—19 X |

JERRY W. MYRACLE, Primary Examiner

U.S. Cl. X.R.

324—19

PO-1050
(5/69)

UNITED STATES PATENT OFFICE
CERTIFICATE OF CORRECTION

Patent No. __3,543,572__  Dated __December 1, 1970__

Inventor(s) __Raymond E. Summerer and John B. Force__

It is certified that error appears in the above-identified patent and that said Letters Patent are hereby corrected as shown below:

Column 1, line 11, "agitation" should read -- ignition --;
Column 3, line 72, "22" should read -- 32 --.

SIGNED AND SEALED
MAR 2 1971

(SEAL)
Attest:

Edward M. Fletcher, Jr.
Attesting Officer

WILLIAM E. SCHUYLER, JR.
Commissioner of Patents